United States Patent [19]

McManis, III et al.

[11] Patent Number: 4,588,662

[45] Date of Patent: May 13, 1986

[54] METHOD AND DEVICE FOR FILLING THE CELLS OF A BATTERY WITH ELECTROLYTE

[75] Inventors: George E. McManis, III; Aaron N. Fletcher; Dan E. Bliss, all of Ridgecrest, Calif.

[73] Assignee: The United States of America as represented by the Secretary of the Navy, Washington, D.C.

[21] Appl. No.: 759,991

[22] Filed: Jul. 29, 1985

[51] Int. Cl.$^4$ .................. H01M 2/36; H01M 6/36
[52] U.S. Cl. .................. 429/52; 429/116; 429/112
[58] Field of Search .................. 429/52, 116, 118, 112

[56] References Cited

U.S. PATENT DOCUMENTS

| | | | |
|---|---|---|---|
| 2,810,776 | 10/1957 | Brill et al. | 429/52 |
| 3,083,252 | 3/1963 | Meyers | 429/52 |
| 3,100,164 | 8/1963 | Solomon et al. | 136/90 |
| 3,343,994 | 9/1967 | Stanimirovitch | 429/52 |
| 3,483,042 | 10/1967 | Hulse | 136/162 |
| 3,619,298 | 11/1971 | Jammet et al. | 429/116 |
| 3,929,508 | 12/1975 | Merz | 136/114 |

Primary Examiner—Donald L. Walton
Attorney, Agent, or Firm—Robert F. Beers; W. Thom Skeer

[57] ABSTRACT

A remote reservoir for automatically dispersing a liquid electrolyte mixture into the cells of a battery upon activation.

7 Claims, 1 Drawing Figure

U.S. Patent     May 13, 1986     4,588,662
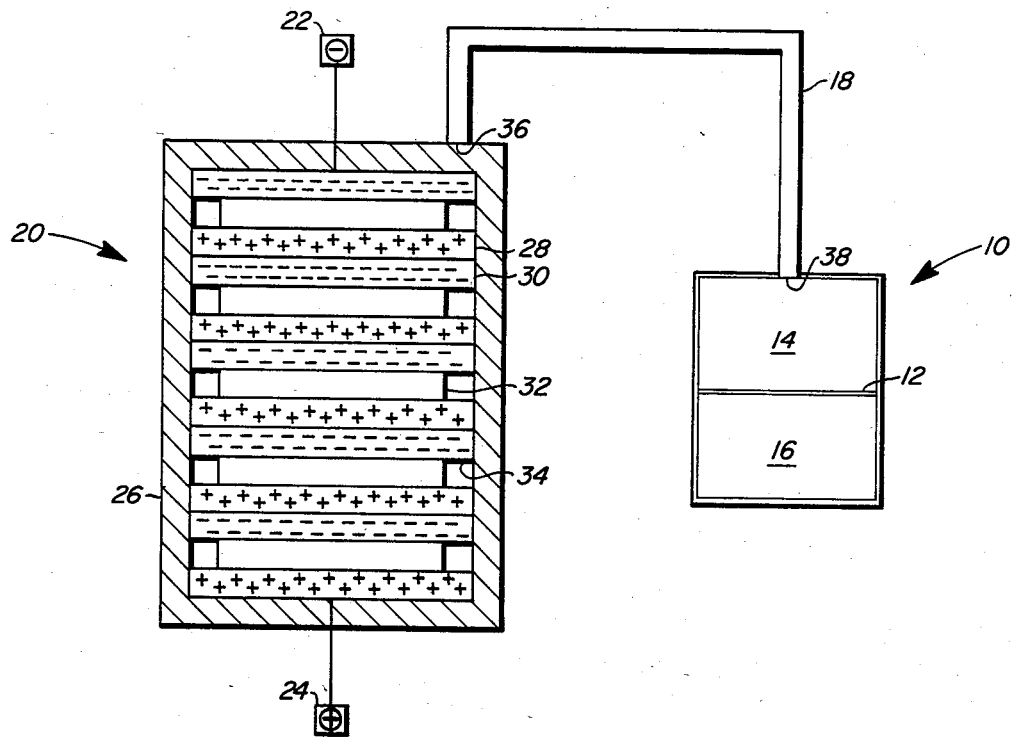

METHOD AND DEVICE FOR FILLING THE CELLS OF A BATTERY WITH ELECTROLYTE

BACKGROUND OF THE INVENTION

1. Field of the Invention

This invention relates to reserve electrochemical energy sources and more particularly to a remote dual chamber electrolyte reservoir containing separate electrolyte components which are mixed upon activation of the reservoir and fed into the cells of a respective multi-cell reserve battery to provide electrochemical energy.

2. Description of the Prior Art

Various means have been used in the prior art to fill batteries with an electrolyte. In the past each cell of the battery was filled individually by pouring the liquid directly from a holding container into the cell filling port or squirting the electrolyte therein with the aid of a squeeze bottle or syringe. In it also known to use a battery filling device which utilizes a flexible container as part of the battery housing to store the electrolyte fluid prior to its dispersal into the battery cells.

Many of the prior art devices and means for discharging electrolyte into the battery cells are cumbersome and unreliable. In addition, none of the prior art devices provide a remote reservoir which maintains an electrolyte component mixture separated into two phases prior to activation thereby precluding degradation of the electrolyte prior to activation.

SUMMARY OF THE INVENTION

The present invention relates to a battery filling apparatus which automatically dispenses an electrolyte into the cells of a battery upon activation of a dual chamber reservoir. The apparatus consists of a reservoir having two chambers separated by a separator layer or partition for retaining an electrolyte component in each respective chamber. A conduit or tube communicates between the reservoir and an evacuated battery chamber providing a passageway for the electrolyte mixture. Upon activation of the reservoir the partition ruptures allowing the electrolyte components to mix. Concurrent therewith, pressure builds up and a frangible seal located in the end section of the tube attached to the reservoir is broken allowing passage of the electrolyte into the cells of the battery.

OBJECTS OF THE INVENTION

An object of the present invention is a battery filling apparatus which will automatically disperse liquid electrolyte into the cells of a battery.

Another object of the invention is a battery having a remote reservoir having dual chambers capable of retaining premix electrolyte components which are blended and automatically introduced into the cells of the battery when the reservoir is activated.

For a clearer understanding of the present invention, together with other and further objects thereof, the following description taken in conjunction with the accompanying drawing is provided.

BRIEF DESCRIPTION OF THE DRAWING

The FIGURE is a schematic representation of the battery filling device interconnected with a multi-cell reserve evacuated battery.

DESCRIPTION OF THE PREFERRED EMBODIMENT

Referring to the FIGURE, a dual chambered reservoir 10 including partition 12 which divides the reservoir into first and second chambers 14 and 16 respectively is provided with conduit 18 in communication with an evacuated multi-cell reserve battery 20 having a negative and a positive lead 22 and 24. Battery 20 includes a housing 26 incorporating a plurality of cells comprising interfacing cathodes 28 and anodes 30 separated one from the other by an electrolyte absorbing separator 32 made of glass fiber or other suitable material, and a space or void 34 at each separator terminus.

The cathode 28 is constructed of one of the following materials: $CuCl_2$, $CuS$, $CuCrO_4$, $Ag_2S$, $Ag_2CrO_4$, $AgCl$, $AgF$, $AgBr$, $AgI$, $FeS_2$, $TiS_2$, $Ag_2MoO_4$, $Ag_2WO_4$, $Ag_2O$, $AgIO_3$, $AgIO_4$ and $(NH_4)_2Ce(NO_3)_6$. Depending upon the particular needs of the system, certain cathodic materials may be preferred.

The anode 30 is preferably made of calcium or lithium. Other suitable materials are: aluminum amalgam, zinc amalgam, zinc, magnesium, lithium-aluminum alloys and lithium-aluminum alloys and lithium-silicon alloys.

In addition, an opening 36 in the battery housing adaptively receives such as by heat sealing, one end of tube or conduit 18 which is in communication with dual chambered reservoir 10. The end of the conduit 18 which is connected to reservoir 10 is provided with a frangible polyolefin separator or seal 38 which is functioned upon activation of the reservoir as described in more detail hereinbelow. In like fashion, a similar seal may be provided at the battery terminus of the tube.

The dual chambered reservoir and conduit or tube are preferably constructed or a polyolefin such as heat shrink or responsive tubing. Partition 12, which is formed in situ during manufacture by means known in the art, can be made of a high molecular weight hydrocarbon such as paraffin wax, or a heat deformable ethylene vinyl acetate or polyethylene material.

The reservoir is configured to contain two relatively high temperature melting electrolyte pre-mix components, one in each chamber. The electrolytes used in this invention include amides, inorganic nitrate salts and mixtures thereof. Unsubstituted amides such as acetamide and urea, are preferred. Monosubstituted amides such as N,N-dimethylurea, N-methylacetamide and diacetamide are also suitable. Several inorganic nitrate salts can be used: lithium nitrate, sodium nitrate and ammonium nitrate.

In order to achieve rapid activation of the battery, heat is applied to reservoir 10 electrically, pyrochemically or by immersion of the reservoir in a thermal container. The application of heat causes the reservoir to contract while at the same time rupturing partition 12 allowing the electrolyte components to mix. Within the reservoir, pressure is produced due to the ongoing contraction of the reservoir which causes frangible seal 38 to rupture. When this occurs, the electrolyte mixture is forced through conduit 18 and into battery 20 whereupon separator elements 32 are saturated allowing ionic conduction between cathodes 28 and anodes 30 resulting in activation of the battery.

While the preferred embodiment has described the utilization of an evacuated battery, it is to be understood that a non-evacuated battery provided with venting means and filled with an inert gas prior to activation may be utilized. These and other modifications of the basic design of the present invention will be apparent to those skilled in the art and such modification within the scope of this invention are intended to be included within the scope of this invention.

What is claimed is:

1. A battery filling apparatus for filling the cells of a battery with electrolyte comprising in combination a reservoir having dual chambers including a partition between said chambers for retaining an electrolyte pre-mix component within said respective chambers, a conduit in sealable communication with a respective evacuated multi-cell reserve battery and said reservoir, said conduit having a frangible seal at the reservoir terminus thereof, and functioning means for activation of said reservoir to cause the transfer of electrolyte from said reservoir through said conduit and into said battery cells.

2. An apparatus according to claim 1 wherein said reservoir is constructed of a polyolefin.

3. An apparatus according to claim 1 wherein said frangible seal is constructed of a high molecular weight hydrocarbon selected from paraffin wax, heat deformable ethylene vinyl acetate and polyethylene.

4. An apparatus according to claim 1 wherein said electrolyte pre-mix component is selected from inorganic nitrate salts and mixtures thereof.

5. An apparatus according to claim 1 wherein said electrolyte pre-mix component is selected from the group consisting of acetamide, urea, N,N'-dimethylurea, N-methylacetamide, diacetamide, lithium nitrate, sodium nitrate and ammonium nitrate.

6. An apparatus according to claim 1 wherein said functioning means for activation of said reservoir comprises the application of heat.

7. A method of filling the cells of a battery with an electrolyte contained in a remote reservoir having partitioned dual chambers comprising application of heat to said reservoir, the reservoir and the battery being interconnected by a conduit having a frangible seal therein such that transference of electrolyte is occasioned by the heat induced contraction of said reservoir, rupturing of said seal under fluid pressure and flow of electrolyte from said reservoir into the battery cells.

* * * * *